Nov. 19, 1929.    F. M. ROSS    1,736,465
RIM CONTRACTING AND EXPANDING TOOL
Filed April 21, 1926    2 Sheets-Sheet 1

Inventor
FREDERICK M. ROSS

By Murray and Burgetter
Attorneys

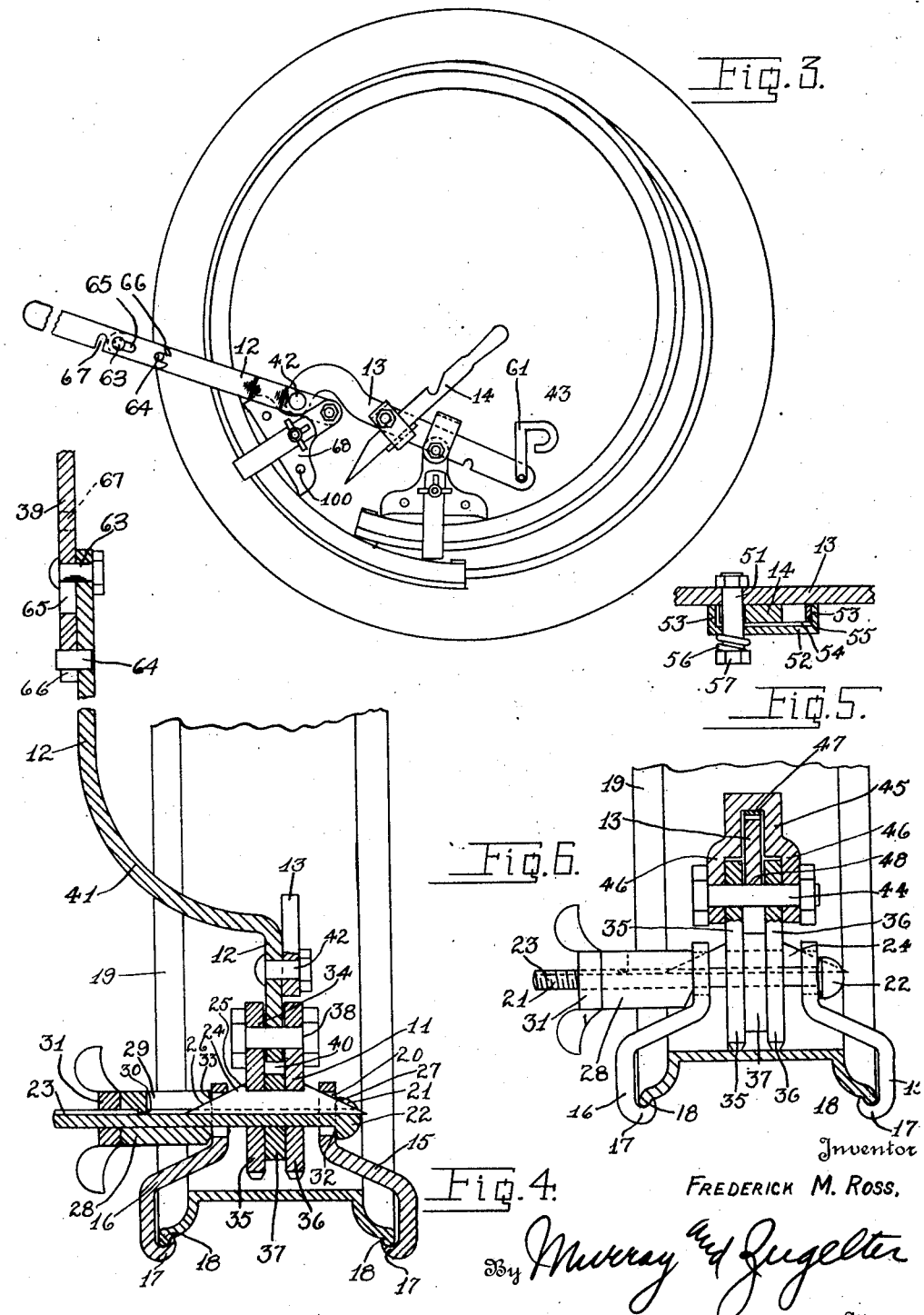

Patented Nov. 19, 1929

1,736,465

UNITED STATES PATENT OFFICE

FREDERICK M. ROSS, OF CINCINNATI, OHIO

RIM CONTRACTING AND EXPANDING TOOL

Application filed April 21, 1926. Serial No. 103,575.

This invention relates to improvements in a tool for contracting and expanding tire rims and has for an object the provision of a device for use with all kinds of rims.

Another object of my invention is to provide a device that may be used for expanding and contracting rims of balloon tires as well as rims of standard tires.

Another object of my invention is to provide a device that is portable and can be compactly folded and placed in a tool box of an automobile or truck, thus making it possible to carry this tool in the machine at all times.

Another object of my invention is to provide a device whereby a minimum of effort is necessary to contract and expand tire rims for removing from and placing tires on the rims.

These and other objects are attained by the means described herein and disclosed in the accompanying drawngs, in which:

Fig. 3 is a view similar to Figs. 1 and 2 showing the device in its final position with a rim sufficiently contracted so as to remove the tire therefrom.

Fig. 4 is a fragmental sectional view taken on line 4—4 of Fig. 2.

Fig. 5 is a sectional view taken on line 5—5 of Fig. 2.

Fig. 6 is a sectional view taken on line 6—6 of Fig. 2.

Figure 1:
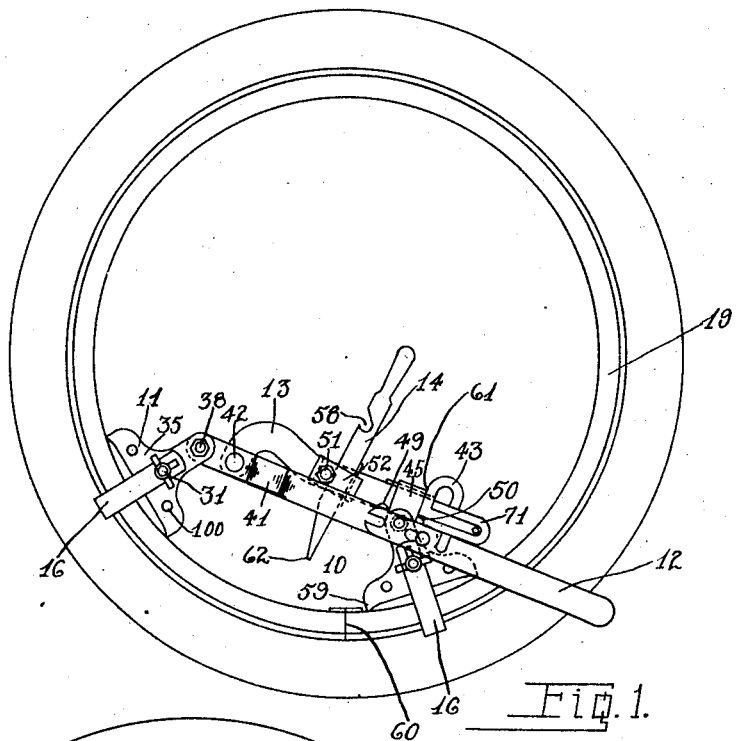
Fig. 1 is a front view of a tire and rim showing a device of my invention mounted in its first position.

The device of my invention comprises generally, a pair of rim gripping members 10 and 11 having a lever 12 pivotally mounted on the forward rim gripping member 11. A link 13 is pivotally connected to the lever 12 and is slidably and pivotally secured to the rear rim gripping member 10. A fulcrum finger 14 is secured to the link 13.

The rim gripping members 10 and 11 are substantially identical, wherefore a description of one will suffice. The member 11 comprises a pair of jaws 15 and 16 having hooks 17 formed at one end which receive the flanges 18 formed on the opposite side of the tire rim 19. Each of the jaws is provided with an elongated aperture 20 at its opposite end through which extends a bolt 21 having a head 22 formed at one end and threads at the opposite end. The bolt 21 is provided with a spline 23 which extends longitudinally of the bolt. A wedge shaped key 24 having a recess 25 formed therein is seated in the spline 23, and has angular faces 26 and 27 extending from the recess 25 to its opposite ends. The wedge 24 extends through the elongated apertures 20 formed in the jaws 15 and 16, the upper edge of the elongated aperture contacting the inclined faces 26 and 27. A sleeve or bushing 28 having a slot 29 formed therein is slidably mounted upon the bolt 21. The sleeve 28 is provided with a tongue 30 which extends into the spline 23 thereby preventing the sleeve 28 from being rotated. The tongue 30 also insures the slot 29 being in alignment with the spline 23. A wing nut 31 is threadedly mounted upon the bolt 21, the inner surface contacting one end of the sleeve 28. The head 22 of the bolt 21 is provided with a slightly rounded surface 32 which contacts the jaw 15. The sleeve 28 has one end 33 in abutment with the opposite jaw 16. From the foregoing description, as shown in Fig. 4, it is readily evident that by rotating the wing nut 31, the surface 33 of the bushing 28 and the shoulder 32 formed on the bolt head 22 are contracted thereby tending to bring the jaws 15 and 16 toward one another. The inclined surfaces 26 and 27 of the wedge 24 cause the jaws to be contracted equally for diminishing the distance between the opposed hooks 17 of the jaws. It is therefore readily evident that a rim gripping means of this type will fit any width and thickness of rim.

The jaws 15 and 16 are mounted on opposite sides of a block 34. The block 34 comprises side plates 35 and 36 having a central or spacing member 37. The side members 35 and 36 and spacing member 37 are received in the recess 25 in the wedge 24 and are retained in position by rivets 100. The upper ends of the plates 35 and 36 are provided with an aperture through which a bolt 38 extends. Bolt 38 forms a pivotal mounting for the lever 12. The spacing member 37 provides a way or opening 40 at the upper ends of the end plates 35 and 36 in which the end of the lever 12 pivots. Lever 12 is provided with an offset 41 whereby the lever is brought outside of the rim 19 for operating my device. The lever 12 is provided with a foldable extension handle 39 pivotally mounted on the pivot 63 carried by lever 12. The lever 12 is provided with a stud 64 fixed at a distance from the pivot 63. The extension handle 39 is provided with an elongated perforation 65 in which the pivot 63 is positioned, whereby the extension handle may be actuated longitudinally of the lever 12. The extension handle 39 is provided with a slot 66 at one end thereof for receiving the stud 64 whereby to secure the extension handle 39 in an operative position. It is readily evident that by shifting the extension handle 39 to the right, see Fig. 2, the slot 66 may be disassociated from the stud 64 whereupon handle 39 may be actuated about the pivot 63. In order that the extension handle 39 may lie within the lines of the lever 12, I have provided a slot 67 in one edge thereof for receiving the stud 64 when the extension handle 39 is actuated to its closed position.

The link 13 is pivotally mounted at 42 to the lever 12. The opposite end of the link 13 is provided with a gauge-handle 43, the purpose of which will be explained later.

The forward rim gripping member 10 is provided at the upper end of its plates 35 and 36 with an aperture through which extends a bolt 44. Bolt 44 forms a pivotal mounting for an inverted U-shaped guide 45. The guide 45 has slidably mounted between its sides 46, the link 13. The free ends of the sides 46 are bent outwardly and extend on the outside of the end plates 35 and 36 of the rim gripping member 10. A spring 47 yieldingly retains the lower edge 48 of the link 13 in engagement with the bolt 44. Intermediate the pivotal mounting 42 of the link 13 and the gauge-handle 43, the link 13 is provided with notches 49 and 50. Intermediate the pivotal mounting 42 and the notch 49 the fulcrum or breaking finger 14 is pivotally mounted to the link 13.

The pivotal mounting of the fulcrum or breaking finger comprises a bolt 51 passing through aligned perforations formed in the link 13 and the finger housing 52. The finger housing 52 is substantially U-shaped having legs 53 which space the housing 52 from the link 13 thereby forming a way 54 through which the fulcrum 14 extends. A spring 55 is secured to one of the legs 53 and yieldably retains the fulcrum in engagement with the bolt 51. An expansion spring 56 is mounted on the bolt 51 and has one end in abutment with the head 57 of the bolt 51 and the other end in abutment with the housing 52. Expansion spring 56 yieldably retains the free ends of the legs 53 in abutment with the link 13 thereby preventing lateral displacement of the fulcrum 14. The fulcrum 14 has formed in it a notch 58 which receives the bolt 51, the purpose of which will be explained later.

Figure 2:
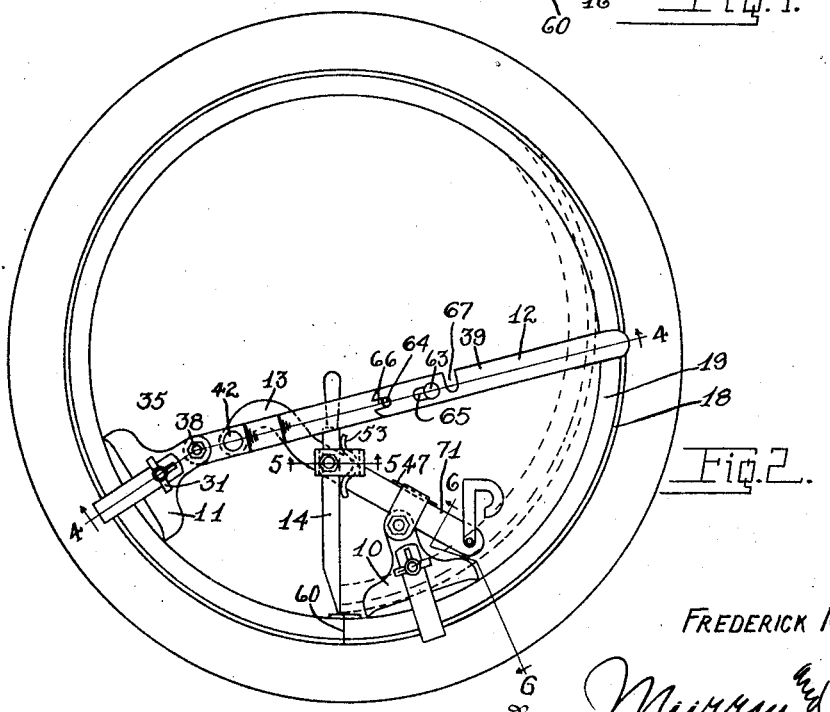
Fig. 2 is a view similar to Fig. 1 showing the device in its second position, ready to "split" the rim.

The operation of my device is as follows:

When it is desired to remove a tire from a split rim, the device of my invention is placed in a position shown in Fig. 1. The forward edge 59 of the block 34 of the rim gripping member 10 is placed about one inch from the split 60 of the rim 19. The jaws 15 and 16, being on the outside of the rim, are contracted by turning the wing nut 31 until these jaws are brought into gripping engagement with the rim. The gauge-handle 43 is then brought into longitudinal alignment with the longitudinal axis of the link 13, as shown in Fig. 1, and the link 13 moved forward through the guide 45 until the flat edge 61 of the gauge-handle 43 contacts the edge af the guide 45. The lever 12 is then brought into longitudinal alignment with the link 13, as shown in Fig. 1, and the forward rim gripping member 11 secured to the rim in the same manner that rim gripping member 10 was secured, as above described. Gauge-handle 43 is then actuated in a clockwise direction into a position as shown in Figs. 2 and 3, in other words removed from its contacting position. The lever 12 is then actuated in a counter clockwise direction until the fulcrum 14 is in a substantial vertical alignment with the split 60 of the rim 19. The fulcrum 14 is then lowered until the bolt 51 is seated in the notch 58 formed in the fulcrum 14. This will bring the point 62 of the fulcrum in engagement with the rim adjacent the split, as shown in Fig. 2. Lever 12 is then actuated in a clockwise direction. This actuation of the lever in a clockwise direction causes the fulcrum point to push the rim outward on one side of the split and causes a counter clockwise movement of that portion 71 of the link 13 on the right hand side of the pivotal mounting thereby drawing the opposite end of the rim toward the center of the rim and effectively breaking it at the split. This breaking of the rim causes one end thereof to be placed on top of the other end, namely, as shown in dotted lines in Fig. 2. The lever 12 may now be moved in a counter clockwise direction for relieving the pressure on the fulcrum point 62. The fulcrum or breaking finger 14 is now positioned as shown in Fig. 3, and the lever again moved in a clockwise direction about its pivotal mounting. This movement does not expand or contract the rim, but simply causes the link 13 to be slidably moved to the right through the guide 45. The link 13 is moved to the right until the bolt 44 of the rim gripping member 10 and notch 49 formed in the link 13 are in alignment, whereupon the spring 47 causes the bolt 44 to seat in the notch 49. As soon as the bolt 44 and notch 49 are in engagement, the lever 12 is moved in a counter clockwise direction for sufficiently contracting the rim 19 to permit removal of the tire therefrom.

The tool may be left on the rim until it is desired to replace the tire, whereupon the parts will again assume the position as shown in Fig. 3. To expand the rim after the tire has been placed thereon the operation is the reverse of that set out above, except that the fulcrum or breaking finger is not used. To expand the rim after the parts have been positioned as shown in Fig. 3, the lever 12 is actuated in a clockwise direction until the rim is in its normal position. Should there not be sufficient leverage or movement of the parts to place the rim in its normal position with the bolt 44 in engagement with the notch 49, the rim is expanded as far as possible with the parts in the position shown, then the link 13 is raised about its pivotal mounting on the lever 12 by means of the gauge-handle 43 until the notch 49 and bolt 44 are disengaged. The lever 12 is then actuated in a counter clockwise direction until the notch 50 and bolt 44 are in alignment and the bolt 44 seated in the said notch 50 formed in the link 13. Movement of the lever in a clockwise direction, with the parts in this position, will permit the rim to be expanded to its normal position.

From the drawings, it is readily evident how my device may be folded into a compact article for transportation or carrying in a tool box or the like.

It should be further noted that I have provided a rim gripping means that is universal for practically any standard width of rim now manufactured. I have found that this means will effectively grip the narrowest as well as the widest rim now on the market.

What I claim is:

1. In a tool for expanding and contracting a split rim the combination of a pair of rim gripping members mounted on the rim one on either side of the split, a lever mounted on one of the rim gripping members, a guide pivotally mounted on the second rim gripping member, a bolt extending through the second rim gripping member and guide and forming a pivotal mounting for the guide, a link pivotally and eccentrically mounted on the lever and slidable through the guide, the link having notches formed therein for engagement with the bolt whereby movement of the lever about its mounting tends to bring the rim gripping members toward one another thereby contracting the rim, and a breaking finger mounted on the link for splitting the rim.

2. In a tire tool the combination of a pair of rim gripping members, a lever pivotally connected to one of the rim gripping members, a link eccentrically and pivotally mounted to the lever and slidably held in engagement with the second rim gripping member, a fulcrum, and means for pivotally and slidably mounting the fulcrum on the link.

3. In a tool for expanding and contracting split rims the combination of a pair of rim gripping members secured to the rim one on either side of the split, an operating lever pivotally mounted on one of the rim gripping members, a link having one end eccentrically mounted on the lever and the other end in adjustable, pivotal engagement with the second rim gripping member and a fulcrum pivotally mounted on the link and contacting the rim adjacent the split.

4. As a new article of manufacture a rim gripping member comprising a block for contacting the rim at two points, a wedge shaped key carried by the block having inclined faces extending from the block in opposite directions, a pair of jaws each having an elongated opening therein through which the inclined wedge extends and having the upper edge of the opening contacting the inclined faces and means for drawing the jaws toward one another up the inclined faces whereby the jaws are equally spaced on opposite sides of the block.

5. As a new article of manufacture a rim gripping device comprising a body portion for contacting a rim at two points, a wedge shaped key carried by the body portion having inclined faces extending from the body portion to points in opposite directions, a pair of rim engaging jaws each having a hook formed at one end and an elongated aperture formed in the opposite end, the upper edge of the elongated aperture contacting the inclined faces of the wedge, a bolt extending through the jaws and body portion and having a spline extending longitudinally thereof, a head having a surface contacting one of the jaws and means carried by the other end of the bolt contacting the second jaw for drawing the jaws toward one another longitudinally of the bolt whereby the hook ends of the jaws are equally spaced from the body portion in all directions.

6. In a tool for contracting and expanding split rims the combination of a pair of rim gripping members adapted to be secured to a rim one on either side of the split, a device operable between the rim gripping members and comprising a lever pivoted to one of the rim gripping members, a link pivoted to the lever and the second rim gripping member, and a fulcrum adapted to contact the rim adjacent the split and secured to the link whereby movement of the lever about its pivotal mounting in one direction causes the ends of the rim to be positioned one above the other and whereby movement of the lever in the opposite direction causes complete contraction of the rim.

In testimony whereof, I have hereunto subscribed my name this 5th day of April, 1926.

FREDERICK M. ROSS.